United States Patent [19]
Lalin

[11] Patent Number: 5,408,886
[45] Date of Patent: * Apr. 25, 1995

[54] POSITIVE DISPLACEMENT PISTON FLOW METER WITH INTERNAL VALVE

[75] Inventor: Hill S. Lalin, Wayne, N.J.

[73] Assignee: Gilian Instrument Corp., West Caldwell, N.J.

[*] Notice: The portion of the term of this patent subsequent to Mar. 22, 2011 has been disclaimed.

[21] Appl. No.: 168,135

[22] Filed: Dec. 17, 1993

Related U.S. Application Data

[63] Continuation-in-part of Ser. No. 98,067, Jul. 28, 1993, Pat. No. 5,295,396, which is a continuation-in-part of Ser. No. 32,754, Mar. 17, 1993, abandoned, and a continuation-in-part of Ser. No. 707,094, May 29, 1991, abandoned.

[51] Int. Cl.[6] .............................................. G01F 3/00
[52] U.S. Cl. ........................................ 73/861; 73/248
[58] Field of Search ................. 73/232, 223, 249, 250, 73/861, 239, 3

[56] References Cited

U.S. PATENT DOCUMENTS

| | | | |
|---|---|---|---|
| 1,618,206 | 2/1927 | Lamb | 73/239 |
| 4,152,922 | 11/1983 | Francisco, Jr. | 73/3 |
| 4,372,147 | 2/1983 | Waugh et al. | 73/3 |
| 4,481,805 | 11/1984 | Dobesh | 73/3 |
| 4,549,426 | 10/1985 | Erickson | 73/3 |
| 4,762,004 | 8/1988 | Lalin et al. | 73/861.05 |
| 4,794,785 | 1/1989 | Cohrs et al. | 73/3 |
| 5,052,211 | 10/1991 | Cohrs et al. | 73/3 |
| 5,209,114 | 5/1993 | Lalin . | |

OTHER PUBLICATIONS

Webster's Third New World Dictionary, 1964; p. 893.

*Primary Examiner*—Herbert Goldstein
*Assistant Examiner*—R. Biegel
*Attorney, Agent, or Firm*—E. Lieberstein

[57] ABSTRACT

A piston flow meter for measuring gas flow through the flow meter comprising a hollow precision bore flowtube in a vertical orientation, with a movable piston containing a valve assembly for movement in concert with the piston between opposite ends of the flowtube. The valve assembly contains a latching mechanism, preferably a magnetic latch, to provide a positive seal across the piston. The magnetic latch is opened when the piston strikes a spring-loaded stop at the top end of the piston stroke, and is closed at the bottom end of the piston stroke.

10 Claims, 3 Drawing Sheets

POSITIVE DISPLACEMENT PISTON FLOW METER WITH INTERNAL VALVE

FIELD OF THE INVENTION

This invention is a continuation-in-part of U.S. Patent application Ser. No. 08/098,067 filed Jul. 28, 1993, now U.S. Pat. No. 5,295,396 and a continuation-in-part of application Ser. No. 07/707,094 filed May 29, 1991, now abandoned and a continuation in part of application Ser. No. 08/032,754 filed Mar. 17, 1993 now abandoned, and relates to air flow measuring devices using a positive displacement piston flow meter and, more particularly, to a reciprocating piston flow meter for measuring gas flow on a continuous basis.

BACKGROUND OF INVENTION

The accurate measurement of ambient fluid (air) flow is becoming increasingly more important in the application and control of many processes, as well as in the research laboratory. One of the major applications is in the field of air sampling, in which an accurate knowledge of the sampled air quality determines the exposure level to various contaminants. The most widely accepted, primary standard method of flow measurement for a gaseous fluid is the bubble flow meter. In the basic form of the bubble flow meter, a soap film is generated from a soap solution, and is propelled by the gas flow under measurement from one end of the flow meter to the other. By timing the rise of the soap film between calibrated volume marks, the volume flow is obtained. Since for all practical purposes, the soap film is massless, it requires almost no force to accelerate the bubble. Furthermore, a seal is always insured by the presence of the bubble. The very nature of the bubble eliminates the friction which is associated with a piston-type flow meter. The soap film flow meter is essentially transparent to the flow being measured, having a no-load effect. Accordingly, the soap film flow meter comes closest to meeting the unique requirements of the ideal calibrator.

The measurement of air flow using a positive displacement reciprocating piston flow meter is susceptible to errors based on the following requirements:

a) Initial breakaway friction;
b) Acceleration and deceleration of the piston after breakaway (until equilibrium is reached);
c) Running friction; and
d) Fixed pressure loading determined by the mass of the piston.

The resolution of the above condition presents a load to the air flow system being measured. The arrangement of the present invention incorporates a valve and a magnetic latch within the piston assembly which minimizes the initial breakaway friction and acceleration forces of the piston on reversing its direction at the bottom end of the piston stroke, and is accelerated downward at the top end of the piston stroke. An additional advantage of the positive displacement piston flow meter of the present invention is its simplicity in design for reversing the direction of the piston on both the upstroke and down-stroke of the piston.

SUMMARY OF THE INVENTION

An improved positve displacement reciprocating piston flow meter for measuring fluid flow has been developed, in accordance with the present invention, using a vertically oriented flow meter assembly having a movable piston disposed within a precision bore flowtube for reciprocating movement between one position at or near the bottom end of the flowtube and an elevated position near the upper end of the flowtube. The piston contains a valve assembly located within the body of the piston for movement in concert with the piston. The valve assembly in the piston is opened on reaching the end of the piston stroke corresponding to the elevated position, and is closed on reaching the opposite end of the piston stroke corresponding to the bottom position. The valve assembly is mechanically activated at each opposite end of the piston stroke to cause the piston to reciprocate in a continuous fashion, or to cause the piston to move from only one end of the piston stroke to another, in response to the presence of air flow in the flowtube. Optical detectors are arranged at predetermined positions along the flowtube for detecting the rate of movement of the piston between the predetermined positions.

The positive displacement piston flow meter of the present invention broadly comprises:

(a) a hollow flowtube vertically oriented to form a top and a bottom end;
(b) a piston disposed in said flowtube for movement between a bottom position, adjacent said bottom end, and an elevated position relative to said top end;
(c) stop means located at said top end and said bottom end of said flow meter, respectively;
(d) means for connecting said flowtube to an external pump for directing a fluid through said flow meter at a flow rate to be measured by said flow meter;
(e) a valve assembly integrated in said piston for movement in concert therewith, with said valve assembly having a valve-open and valve-closed position, said valve assembly comprising: a valve body, at least one valve passageway for providing fluid access through said piston in the valve-open position, a valve head, a movable valve stem, slidable within said valve body and connected to said valve head, and latching means for holding said valve assembly in said valve-closed position until said valve stem strikes said stop means, such that upon reaching said top end, said piston is caused to reverse direction and to descend by gravity to said bottom end, and upon reaching said bottom end, is caused to reverse direction and ascend back to said top end; and
(f) photoelectric sensor means arranged at different positions along said flowtube, relative to said bottom position and elevated position, for detecting the presence of said piston at each such position.

BRIEF DESCRIPTION OF THE DRAWINGS

Other features and advantages of the present invention will become apparent from the following detailed description of the invention when read in conjunction with the accompanying drawings of which.

DETAILED DESCRIPTION OF THE INVENTION

Figure 1:
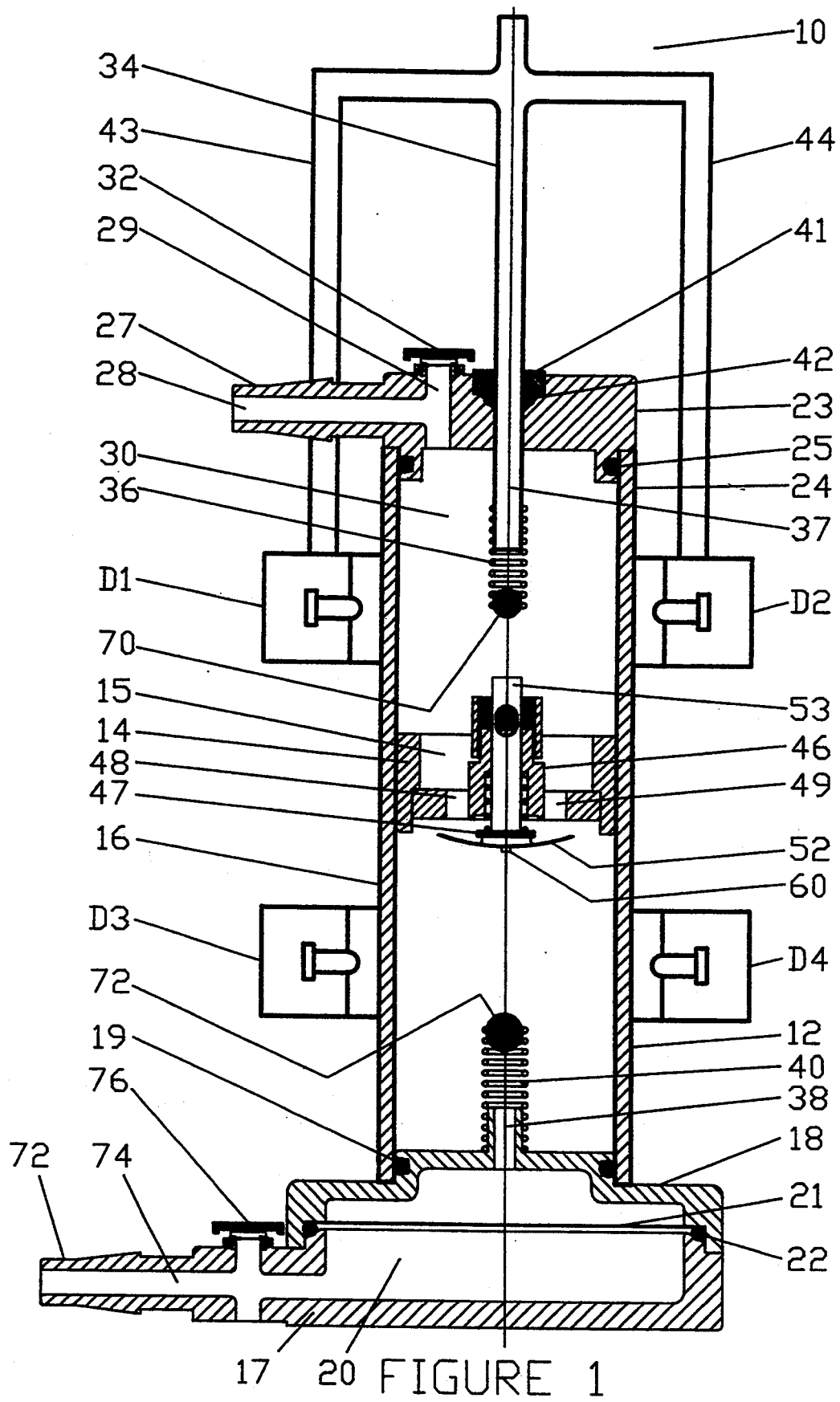
FIG. 1 is a view in vertical section of the preferred embodiment of the piston flow meter of the present invention, with the piston shown in the valve-open position during its descent from the top to the bottom end of the flowtube.
Figure 2:
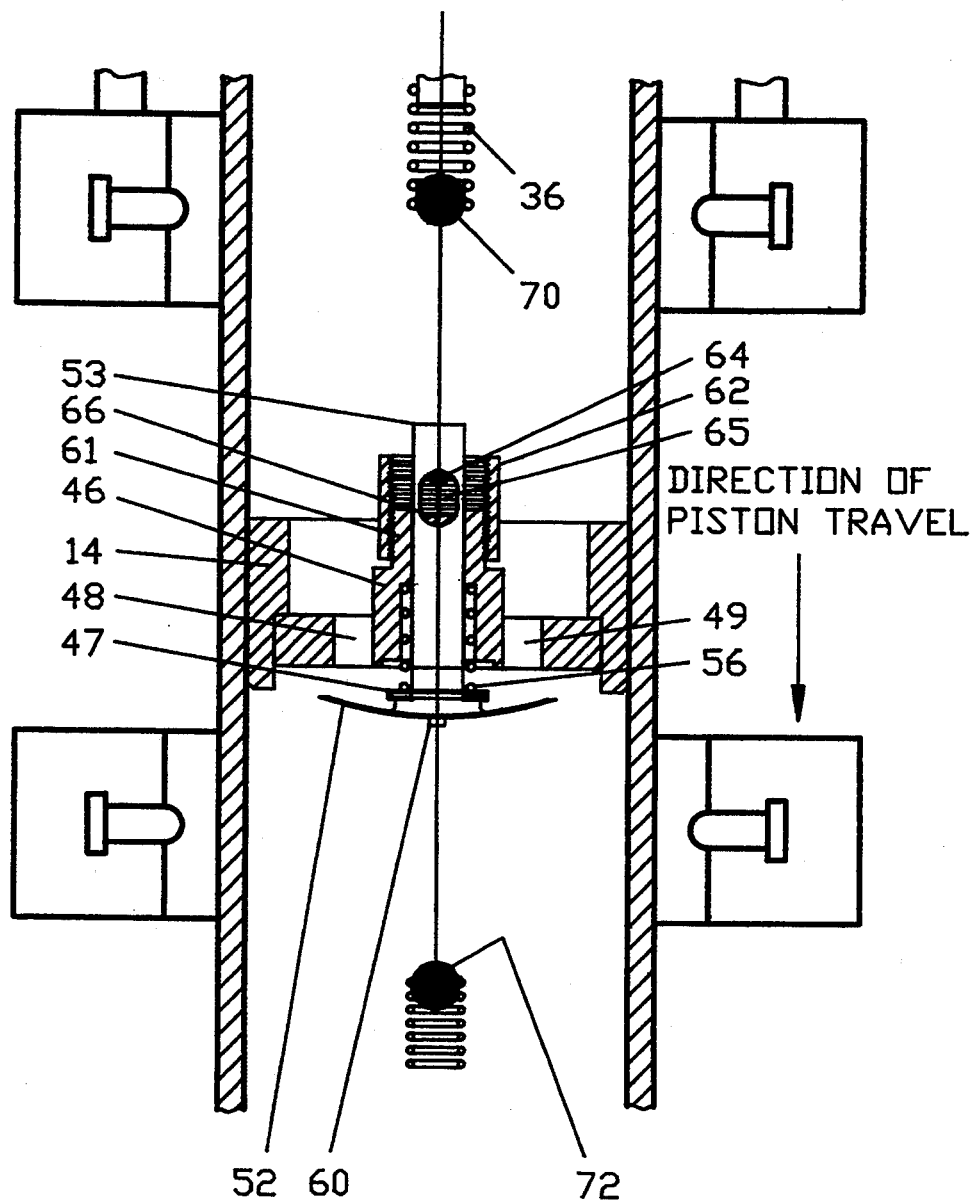
FIG. 2 is an enlarged, fragmentary view of a section of the flow meter of the present invention, for illustrating the piston, valve assembly, and magnetic latch of FIG. 1, with the valve shown in the valve-open position during the descent of the piston to the bottom end of the flowtube.
Figure 3:
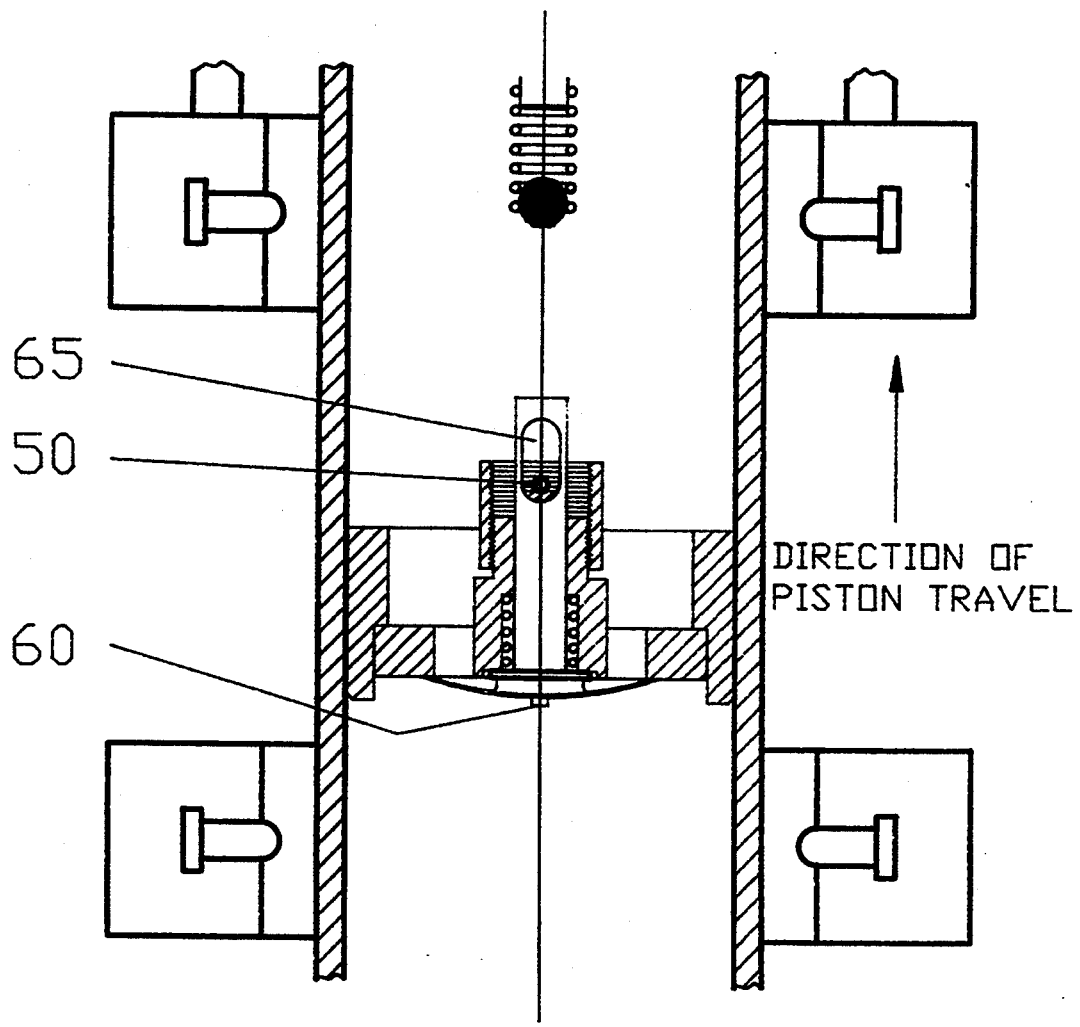
FIG. 3 is another enlarged, fragmentary view of a section of the flow meter of the present invention, for illustrating the piston, valve assembly, and magnetic latch of FIG. 1, with the valve shown in the valve-closed position during the ascent of the piston from the bottom end to the top end of the flowtube.

The flow meter of the present invention is identified by the reference numeral (10), with its corresponding parts identified in FIGS. 1-3 by the same reference numbers. The flow meter (10) comprises a hollow, cylindrical, open-ended precision bore flowtube (12) having a lightweight, smooth surface piston (14) fitted therein to a tight tolerance to provide substantially leakproof and frictionless movement. The piston (14) is composed of a solid material, such as graphite, and contains a valve assembly (15) which, in concert with the piston (14), reciprocates from a position adjacent the bottom end (16) of the flowtube (12) to an elevated position adjacent to the upper end (24) of the flowtube (12) and back.

The flowtube (12) is supported in a substantially vertical position, with its bottom end (16) mounted on a platform (18), supported on a base (17) and sealed by an O-ring (19). An internal chamber (20), formed between the base (17) and the platform (18), communicates with an inlet fitting (72), having a passageway (74) for providing access to an external pump (not shown), or to the atmosphere, based on the position of a manually operated poppet valve (76) interconnected between the inlet fitting (72) and the chamber (20). The platform (18) has a hollow member (38) extending into the flowtube (12) to provide a passageway for ingress and egress of air from the flow meter (12) at the bottom end thereof. An air filter (21) is located in the chamber (20) to filter incoming air from the passageway (74) to the flowtube (12), and is secured by an O-ring (22) against leakage.

The top end (24) of the flowtube (12) has a cover plate (23) press-fitted in the flowtube (12), and is sealed from the atmosphere by an O-ring (25). An outlet fitting (27) extends from the cover plate (23) to an external pump (not shown) for drawing air from the piston flow meter (10). The external pump (not shown) is intended to be connected to fitting (27) or to the fitting (72). For simplicity, the present invention will be described based on connecting fitting (27), to the external vacuum pump, with fitting (72) open to the atmosphere.

The outlet fitting (27) provides a fluid passageway (28), which communicates through the passageway (29) to the chamber (30) formed between the piston (14) and the top end (24) of the flowtube (12). The passageway (29) extends to a manually controlled switch or poppet valve (32), which normally operates in the closed position, as shown, to permit continuous flow meter operation. In its open position, the passageway (28) is open to the atmosphere through valve (32). The poppet valve (32) may also be momentarily depressed for a single-stroke operation of the piston (14). A solid shaft (34) extends through the cover plate (23) into the area (30), and includes a compression spring (36) mounted over its free end (37) for stopping the piston (14) at the upper end of the piston stroke, and for opening the valve assembly (15), as will be explained in detail hereafter. The hollow member (38), extending from the platform (18), also supports a compression spring (40) for stopping the piston (14) at the lower end of the piston stroke. The compression spring (36) contains a flexible ball (70) fitted within the spring (36) to assure positive contact with the valve stem (53) of the valve assembly (15). A similar flexible ball (72) is located in the compression spring (40).

The shaft (34) is supported in the cover plate (23) by a retaining plug (41) and an O-ring (42). The shaft is also mechanically connected through the arms (43) and (44) to an upper set of photoelectric sensor elements (D1) and (D2), respectively, which are positioned adjacent to the flowtube (12) to detect the piston (14) when it reaches a height corresponding to the position of the sensor elements (D1) and (D2).

A second set of photoelectric sensor elements (D3) and (D4) are positioned adjacent to the bottom end of the flowtube (12), and are spaced a predetermined distance from the upper set of sensor elements (D1) and (D2). Each set of photoelectric sensor elements may consist of an IR transmitter and receiver, with the position of each set along the flowtube (12) corresponding to each opposite end of the piston stroke. The displaced transit time of the piston (14) between the two sets of sensor elements is used in a conventional manner to calculate fluid flow. All of the photoelectric sensor elements operate in a conventional manner, and are preferably connected to a conventional electronic control system (not shown) for automatically calculating and recording flow rate. The spacing between the two sets of sensor elements may be mechanically adjusted by depressing or extending the shaft (34) to correspond to different ranges of fluid flow.

The valve assembly (15), as is more specifically shown in FIG. 2 and FIG. 3, includes a valve body (46) having one or more valve openings (48) and (49), or a single annular opening, an elastomeric valve head (52), a valve stem (53) extending from the valve head (52) through the valve body (46), and a compression spring (56) seated in the valve body (46) around the valve stem (53). A stop washer (47) is placed between the valve head (52) and the valve stem (53) to hold the compression spring (56) in place. The valve head (52) may also have a valve stop (60) to provide positive contact with the flexible ball (72) at the bottom end of the piston stroke, The valve body (46) is formed as an integral part of the piston (14), and has an externally threaded boss (61) extending from the valve body (46) which is connected to an internally threaded tubular section (62). The attachment of the tube (62) to the boss (61) is manually adjustable. A steel pin (64) is secured to the inside diameter of the body of the tube (62) so that it projects outwardly, transverse to the longitudinal axis of the tube (62). The valve stem (53) has an oblong hole (65), as shown in FIG. 3, with a magnet (66) secured to the valve stem (53) at one of the longitudinal ends of the hole (65). The magnet (66), in combination with the steel pin (64), functions as the magnetic latch (50). The position of the steel pin (64) relative to the magnet (66) is adjustable by adjusting the threaded connection of the tube (62) on the boss (61).

With the outlet fitting (27) attached to the suction side of a conventional vacuum pump and assuming the valve (32) is in the closed position, air will be drawn from the chamber (30) above the piston (14), forcing the piston (14) to rise, as shown in FIG. 3, from a position at the bottom end of the flow meter, with the valve assembly (15) in its valve-closed position, in which the steel pin (64) is magnetically held against the magnet (66). The piston (14) upon reaching the upper end of the flow meter will engage the flexible ball (70) in the compression spring (36), as illustrated in FIG. 3, and continue to rise forcing the spring (36) to compress until the spring compression force is of a sufficient magnitude to overcome the magnetic latch (50) and to force the valve assembly (15) into the valve-open position by pushing the valve stem (53) downward to lift the valve head (52) off the valve openings (48) and (49). The compression spring (36) not only causes the valve to open by overcoming the magnetic latching force, but also initiates and accelerates the downward movement of the piston (14), which continues to drop by gravity, as illustrated in FIG. 2, until the stop (60) on the valve head (52) engages the flexible ball (72) extending from the compression spring (40) at the bottom end of the flowtube (12). During the descent of the piston (14), the valve head (52) is maintained in the valve-open position by the compression spring (56). Upon contacting the ball (72) the valve head (52) is forced back into the magnetically latched valved-closed position against the force of the compression spring (56) and the cycle repeats itself, causing the piston to ascend. The magnetic latching force is adjustable by adjustment of the tube (62). The compression spring (40) at the bottom end of the flowtube assists the piston to reverse direction, giving it a lift off, which minimizes any existing breakaway friction.

Any fluid, preferably gaseous, may be introduced into the flowmeter through either fitting (27) or (72) in accordance with the detailed description of the invention using an external pump (not shown). The flow meter of the present invention will accurately measure the flow rate of the fluid pumped through the flowmeter over a wide range of flow rates. Although a magnetic latch (50) is preferred a non-magnetic latching mechanism may be used which may be mechanical or electronic such as e.g. a solenoid or an electronic switch. This is however less desirable compared to a magnetic latch which permits the system to operate without wires or external interference i.e. as a closed system. A magnetic latch is also less expensive and less complicated compared to an electronic device.

What is claimed is:

1. A piston flow meter for measuring fluid flow through the flow meter comprising:
   (a) a hollow flowtube having a top end and a bottom end;
   (b) a piston disposed in said flowtube for movement between a bottom position, adjacent said bottom end, and an elevated position relative to said top end;
   (c) stop means located at said top end and said bottom end of said flowtube respectively;
   (d) means for connecting said flowtube to an external pump for directing a fluid through said flow meter at a flow rate to be measured by said flowmeter;
   (e) a valve assembly integrated in said piston for movement in concert therewith, with said valve assembly having a valve open and valve closed position, said valve assembly comprising: a valve body, at least one valve passageway for providing fluid access through said piston in the valve open position, a valve head, a movable valve stem slidable within said valve body and connected to said valve head and latching means for holding said valve in one of said valve positions until said valve stem strikes said stop means, said latching means having a permanent magnet member and a steel member with one member connected to said valve stem and the other member connected to said valve body such that upon reaching said top end said permanent magnet is forcibly released from said steel member allowing said piston to reverse direction and to descend by gravity to said bottom end and upon reaching said bottom end said piston is caused to reverse direction and ascend back to said top end with said permanent magnet reengaged to said steel member; and
   (f) photoelectric sensor means arranged at different positions along said flowtube, relative to said bottom position and elevated position, for detecting the presence of said piston at each position.

2. A piston flow meter, as defined in claim 1, wherein said fluid is a gaseous medium such as atmospheric air.

3. A piston flow meter, as defined in claim 2, wherein valve assembly further comprises a compression spring mounted between said valve head and said valve body for urging said valve assembly into said valve-open position.

4. A piston flow meter, as defined in claim 3, wherein said magnet is connected to said valve stem, and wherein said steel member is connected to said valve body such that when said valve assembly is in the valve-closed position, said steel member is magnetically latched to said magnet.

5. A piston flow meter, as defined in claim 4, wherein said valve assembly further comprises a manually adjustable member extending from said valve body, to which said steel member is affixed for adjusting the relative magnetic latching force between said magnet and said steel member.

6. A piston flow meter, as defined in claim 5, wherein said valve stem has an oblong opening in which said permanent magnet is mounted.

7. A piston flow meter, as defined in claim 3, wherein said stop means comprises a compression spring.

8. A piston flow meter, as defined in claim 7, wherein said stop means further comprises a flexible ball contained in said compression spring to contact said valve head at said bottom end of the flow meter and to contact said valve stem at said top end of said flowmeter.

9. A piston flow meter as defined in claim 7 wherein said means for connecting said flowtube to an external pump for directing a fluid through said flow meter comprises a fitting and a popper valve with said popper valve having an open and closed position for providing manual and continuous operation of said flowmeter.

10. A piston flow meter as defined in claim 9 wherein when said poppet valve is in the closed position said flowmeter operates continuously.

* * * * *